(12) United States Patent
Hassan et al.

(10) Patent No.: US 8,022,153 B2
(45) Date of Patent: Sep. 20, 2011

(54) SYSTEM AND PROCESS FOR PRODUCTION OF POLYETHYLENE AND POLYPROPYLENE

(75) Inventors: Abbas Hassan, Sugar Land, TX (US); Ebrahim Bagherzadeh, Sugar Land, TX (US); Rayford G. Anthony, College Station, TX (US); Gregory Borsinger, Chatham, NJ (US); Aziz Hassan, Sugar Land, TX (US)

(73) Assignee: H R D Corporation

( * ) Notice: Subject to any disclaimer, the term of this patent is extended or adjusted under 35 U.S.C. 154(b) by 147 days.

(21) Appl. No.: 12/141,191

(22) Filed: Jun. 18, 2008

(65) Prior Publication Data

US 2009/0018286 A1    Jan. 15, 2009

Related U.S. Application Data

(60) Provisional application No. 60/946,450, filed on Jun. 27, 2007, provisional application No. 60/946,456, filed on Jun. 27, 2007.

(51) Int. Cl.
*C08F 2/00* (2006.01)
*C08F 110/06* (2006.01)
*C08F 110/02* (2006.01)

(52) U.S. Cl. ........... 526/88; 526/351; 526/352; 526/908

(58) Field of Classification Search ............ 526/88, 526/351, 352, 908
See application file for complete search history.

(56) References Cited

U.S. PATENT DOCUMENTS

| | | | | |
|---|---|---|---|---|
| 2,918,460 A | * | 12/1959 | Schappert | 526/70 |
| 3,062,801 A | * | 11/1962 | Hoeg et al. | 526/159 |
| 3,166,538 A | * | 1/1965 | Olson et al. | 526/86 |
| 3,278,510 A | * | 10/1966 | Ingberman | 526/159 |
| 3,330,818 A | * | 7/1967 | Derby | 526/88 |
| 3,341,503 A | * | 9/1967 | Paige et al. | 526/65 |
| 3,781,320 A | | 12/1973 | Irwin | |
| 4,200,614 A | | 4/1980 | Colburn et al. | |
| 4,724,269 A | | 2/1988 | Suzuki et al. | |

(Continued)

FOREIGN PATENT DOCUMENTS

DE    4106320 A1    9/1992

(Continued)

OTHER PUBLICATIONS

International Search Report, International Application No. PCT/US2008/067830, dated Dec. 18, 2008.

(Continued)

*Primary Examiner* — David Wu
*Assistant Examiner* — Elizabeth Eng
(74) *Attorney, Agent, or Firm* — Porter Hedges LLP; Timothy S. Westby

(57) ABSTRACT

A method for producing a polyethylene or polypropylene polymer, or co-polymer thereof, comprises contacting a monomer-containing medium with polymerization catalyst particles in at least one high shear mixing device to form a nanodispersion, wherein the particles have a mean diameter less than 1 micron. The monomer is selected from the group consisting of ethylene, propylene, and combinations thereof. The method further includes subjecting the nanodispersion to polymerization conditions comprising pressure in the range of about 203 kPa to about 6080 kPa (about 2 atm to about 60 atm) and temperature in the range of about 20° C. to about 230° C., whereby at least a portion of the monomer is polymerized. A system for carrying out the method is also disclosed.

17 Claims, 2 Drawing Sheets

U.S. PATENT DOCUMENTS

| | | | |
|---|---|---|---|
| 4,886,905 | A | 12/1989 | Larkins, Jr. |
| 4,914,029 | A | 4/1990 | Caransa et al. |
| 4,950,831 | A | 8/1990 | Staton et al. |
| 5,009,816 | A | 4/1991 | Weise et al. |
| 5,264,087 | A | 11/1993 | Lowery et al. |
| 5,382,358 | A | 1/1995 | Yeh |
| 5,451,348 | A | 9/1995 | Kingsley |
| 5,608,017 | A * | 3/1997 | Kamiyama et al. ............ 526/88 |
| 5,710,355 | A | 1/1998 | Krishnamurti |
| 5,756,714 | A | 5/1998 | Antrim et al. |
| 5,877,350 | A | 3/1999 | Langer et al. |
| 6,194,625 | B1 | 2/2001 | Graves et al. |
| 6,251,289 | B1 | 6/2001 | Sherman |
| 6,368,366 | B1 | 4/2002 | Langer et al. |
| 6,368,367 | B1 | 4/2002 | Langer et al. |
| 6,383,237 | B1 | 5/2002 | Langer et al. |
| 6,693,213 | B1 | 2/2004 | Kolena et al. |
| 6,768,021 | B2 | 7/2004 | Horan et al. |
| 6,787,036 | B2 | 9/2004 | Long |
| 6,809,217 | B1 | 10/2004 | Colley et al. |
| 2003/0043690 | A1 | 3/2003 | Holl |
| 2004/0052158 | A1 | 3/2004 | Holl |
| 2005/0033069 | A1 | 2/2005 | Holl et al. |
| 2006/0272634 | A1 | 12/2006 | Nehmer et al. |

FOREIGN PATENT DOCUMENTS

| | | | |
|---|---|---|---|
| EP | 1604969 | A | 12/2005 |
| JP | 61183235 | A | 8/1986 |
| JP | 2000143706 | A | 5/2000 |
| JP | 2002003505 | A | 1/2002 |
| JP | 2000121353 | A | 4/2002 |
| JP | 2002121353 | A | 4/2002 |
| JP | 2007505201 | A | 3/2007 |
| WO | 9843725 | A | 10/1998 |
| WO | 2005108533 | A2 | 11/2005 |
| WO | 2007023864 | Y | 3/2007 |

OTHER PUBLICATIONS

Office Action Dated Apr. 20, 2010 for U.S. Appl. No. 12/411,660.
Office Action Dated Apr. 20, 2010 for U.S. Appl. No. 12/427,286.
Office Action Dated Apr. 23, 2010 for U.S. Appl. No. 12/568,155.
Office Action Dated Apr. 27, 2010 for U.S. Appl. No. 12/568,280.
Office Action Dated May 5, 2010 for U.S. Appl. No. 12/142,120.
Office Action Dated Jun. 25, 2009 for U.S. Appl. No. 12/142,447.
Office Action Dated Jan. 7, 2010 for U.S. Appl. No. 12/142,447.
Office Action Dated May 13, 2010 for U.S. Appl. No. 12/142,447.
Office Action Dated Feb. 4, 2010 for U.S. Appl. No. 12/492,721.
Office Action Dated Feb. 18, 2010 for U.S. Appl. No. 12/635,433.
Office Action Dated Feb. 18, 2010 for U.S. Appl. No. 12/635,454.
Office Action Dated May 14, 2010 for U.S. Appl. No. 12/137,441.
Office Action Dated Feb. 19, 2010 for U.S. Appl. No. 12/144,459.
Office Action Dated Sep. 2, 2009 for U.S. Appl. No. 12/142,433.
Office Action Dated Jan. 29, 2010 for U.S. Appl. No. 12/142,433.
Office Action Dated May 24, 2010 for U.S. Appl. No. 12/142,433.
Office Action Dated Apr. 30, 2010 for U.S. Appl. No. 12/141,191.
Office Action Dated Oct. 27, 2009 for U.S. Appl. No. 12/142,120.
Office Action Dated May 5, 2010 for U.S. Appl. No. 12/571,537.
European Search Report for Application No. EP 08771699 dated Nov. 26, 2010, 7 pages.

* cited by examiner

SYSTEM AND PROCESS FOR PRODUCTION OF POLYETHYLENE AND POLYPROPYLENE

CROSS-REFERENCE TO RELATED APPLICATIONS

This application claims the benefit under 35 U.S.C. §119 (e) of U.S. Provisional Patent Application No. 60/946,450 filed Jun. 27, 2007, and U.S. Provisional Patent Application No. 60/946,456 filed Jun. 27, 2007, the disclosures of which are hereby incorporated herein by reference.

STATEMENT REGARDING FEDERALLY SPONSORED RESEARCH OR DEVELOPMENT

Not Applicable.

TECHNICAL FIELD

The present invention generally relates to the liquid phase polymerization of ethylene or propylene monomer, in the presence of a highly dispersed catalyst, to form polyethylene or polypropylene, respectively. More particularly, the invention relates to apparatus and methods for producing polyethylene or polypropylene which employ high shear mixing of the reactants.

BACKGROUND

Polyethylene is a thermoplastic material that is created through polymerization of ethylene monomer, and which is used in the manufacture of a wide variety of consumer products, including packaging, pipe extrusion, wire and cable sheathing and insulation, and many other products. Because ethylene has no substituent groups to influence the stability of the propagation head of the growing polymer chain, polymers of varying degrees of branching can be produced through radical polymerization, anionic addition polymerization, ion coordination polymerization or cationic addition polymerization. Today one of the most common methods of preparing highly desirable linear (high density) polyethylene involves contacting ethylene with a Ziegler-Natta catalyst system that includes a transition metal catalyst such as $TiCl_4$ and an organo-compound of a non-transition metal of Groups IA to IIIA of the Periodic Table of the Elements, particularly organo-aluminium compounds.

Polypropylene is another thermoplastic polymer that is widely used in the manufacturing of a variety of products, including housings and parts for small and large appliances, disposable containers, food packaging, ropes, textiles and plastic automobile parts, and many more. It is chemically synthesized by the catalyzed polymerization of propylene monomer. Polypropylene is most often produced as a stereospecific polymer. Isotactic polypropylene has all the pendant methyl groups oriented either above or below the polymer chain. Any deviation or inversion in the structure of the chain lowers the degree of isotacticity and crystallinity of the polymer. Most commercially available polypropylene is made with titanium chloride catalysts to produce substantially isotactic polypropylene, which is highly desirable for making a number of products that require a strong polymer.

Ziegler-Natta catalysts are stereospecific complexes that limit incoming monomers to a specific orientation, only adding them to the polymer chain if they are oriented in a specific direction, to produce isotactic (unbranched) polymers. Because the organo-compounds of transition metals are useful polymerization catalysts only when supported, they are supported on a suitable matrix material such as alumina, silica, or magnesia. Conventional Ziegler-Natta catalysts are stereospecific complexes formed from a halide of a transition metal, such as titanium, chromium or vanadium with a metal hydride and/or metal alkyl, typically an organoaluminum compound such as an alkylaluminum compound, for example, triethylaluminum (TEAL), trimethyl aluminum (TMA) or triisobutyl aluminum (TIBAL), as a co-catalyst. Both liquid phase slurry (suspension) polymerization and gas phase polymerization have been catalyzed using Ziegler-Natta catalysts. Although polymerization rates increase with temperature, reaction temperatures above 70-100° C. seldom are employed because high temperatures result in loss of stereospecificity as well as lowered polymerization rates as a result of the decreased stability of the initiator. In many polyolefin manufacturing processes today metallocene based catalysts are replacing some Ziegler-Natta catalysts.

Other transition metal catalysts that polymerize ethylene are based on the oxides of chromium or molybdenum. Other transition metal catalyst systems include the organo-compounds of transition metals with π-allyl, cyclopentadienyl, norbornyl, benzyl, and arene groups and also compounds including groups of the type exemplified by the neopentyl and substituted silylmethyl compounds. Catalysts that promote branching of the polymer are employed when a low-density polyethylene is sought.

In a typical liquid phase slurry (suspension) polymerization process ethylene or propylene monomer is dissolved in an organic reaction medium and then contacted with a particulate catalyst. The polyethylene or polypropylene that is formed is also dissolved in the organic medium, which can become quite viscous. Although polymerization rates increase with temperature, reaction temperatures above 70-100° C. seldom are employed because high temperatures result in loss of stereospecificity as well as lowered polymerization rates as a result of the decreased stability of the catalyst.

At the present time, solution polymerization is generally considered to be limited to production of low molecular weight polyethylene and polypropylene. Existing processes and production facilities for producing these polymers are typically subject to various constraints including mass flow limitations, product yield, plant size and energy consumption. Accordingly, there is continued interest in the development of ways to improve the selectivity and yield of polymers from catalyzed polymerization of ethylene and propylene monomers.

SUMMARY

In accordance with certain embodiments of the invention, a method for producing polyethylene is provided which comprises obtaining a high shear mixing device; forming in the high shear mixing device a high shear mixture comprising ethylene and a polymerization catalyst dispersed in a solvent, wherein the high shear mixture comprises submicron-sized particles dispersed in a liquid phase; and subjecting the high shear mixture to polymerization conditions comprising pressure in the range of about 203 kPa to about 6080 kPa and temperature in the range of about 20° C. to about 230° C., whereby at least a portion of the ethylene is polymerized to form polyethylene. In some embodiments the high shear mixture comprises submicron-sized ethylene gas-containing bubbles.

In accordance with certain embodiments of the invention, a method for producing polypropylene is provided which comprises obtaining a high shear mixing device; forming in the high shear mixing device a high shear mixture comprising propylene and a polymerization catalyst dispersed in a solvent, wherein the high shear mixture comprises submicron-sized particles dispersed in a liquid phase; and subjecting the high shear mixture to polymerization conditions comprising pressure in the range of about 203 kPa to about 6080 kPa and temperature in the range of about 20° C. to about 230° C., whereby at least a portion of the propylene is polymerized to form polypropylene. In some embodiments, the high shear mixture comprises submicron-sized propylene gas-containing bubbles.

In accordance with certain embodiments of the invention, a method for producing a polymer is provided which comprises obtaining a high shear mixing device; forming in the high shear mixing device a high shear mixture comprising a monomer and a solvent, wherein the monomer is selected from the group consisting of ethylene, propylene, and mixtures thereof, and subjecting the high shear mixture to polymerization conditions comprising subjecting the high shear mixture to a pressure in the range of about 203 kPa to about 6080 kPa and a temperature in the range of about 20° C. to about 230° C., to form polyethylene or polypropylene, or a copolymer thereof. In some embodiments, the high shear mixture comprises submicron-sized ethylene or propylene gas-containing bubbles dispersed in the solvent.

In accordance with certain other embodiments of the invention, a system for production of polyethylene or polypropylene is provided which comprises at least one high shear mixing device configured for producing a nanodispersion comprising submicron-sized particles dispersed in a monomer-containing liquid or gas phase. These and other embodiments and potential advantages will be apparent in the following detailed description and drawings.

DETAILED DESCRIPTION

The present methods and systems for the production of polyethylene and polypropylene, and their various copolymers, via heterogeneous liquid-solid, liquid-gas-solid, or gas-solid phase polymerization of the corresponding monomers and comonomers, in the presence of a suitable catalyst or initiator, employ an external high shear mechanical device to provide rapid contact and mixing of chemical ingredients in a controlled environment in the high shear mixer device, and a separate vessel or reactor. The high shear device reduces the mass transfer limitations on the reaction and thus increases the overall reaction rate.

Chemical reactions involving liquids, gases and solids rely on the laws of kinetics that involve time, temperature, and pressure to define the rate of reactions. In cases where it is desirable to react two or more raw materials of different phases (e.g. solid and liquid; liquid and gas; solid, liquid and gas), one of the limiting factors in controlling the rate of reaction involves the contact time of the reactants. In the case of heterogeneously catalyzed reactions there is the additional rate limiting factor of having the reacted products removed from the surface of the catalyst to enable the catalyst to catalyze further reactants. Contact time for the reactants and/or catalyst is often controlled by mixing which provides contact with two or more reactants involved in a chemical reaction. A reactor assembly that comprises an external high shear device or mixer as described herein makes possible decreased mass transfer limitations and thereby allows the reaction to more closely approach kinetic limitations. When reaction rates are accelerated, residence times may be decreased, thereby increasing obtainable throughput. Product yield may be increased as a result of the high shear system and process. Alternatively, if the product yield of an existing process is acceptable, decreasing the required residence time by incorporation of suitable high shear may allow for the use of lower temperatures and/or pressures than conventional processes. In some cases, it may be possible to reduce the reactor size while maintaining the same product yield.

System for Production of Polyethylene or Polypropylene

Figure 1:
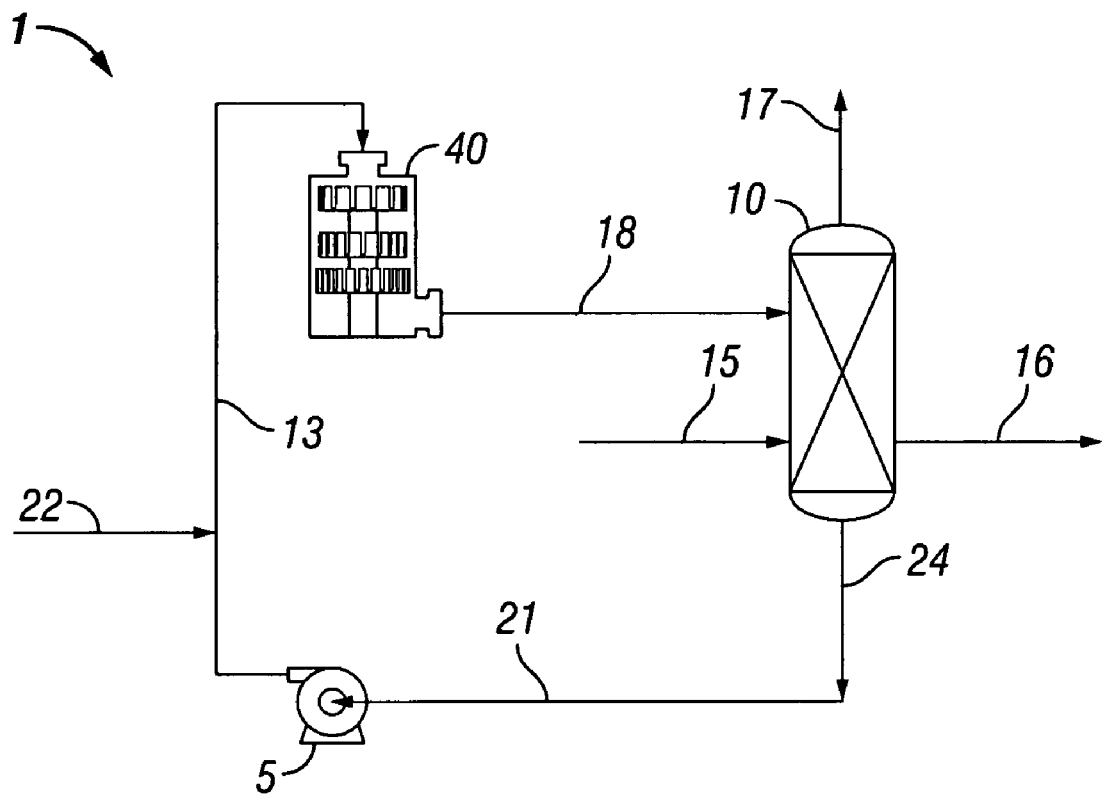
FIG. 1 is a process flow diagram of a process for production of either polyethylene or polypropylene, in accordance with an embodiment of the present invention.

A high shear system will now be described in relation to FIG. 1, which is a process flow diagram showing an embodiment of a high shear system 1 for the production of polyethylene or polypropylene by catalyzed polymerization of the corresponding monomer. It should be understood that a similar method and system is employed to prepare polyethylene and/or polypropylene copolymers from the corresponding monomers and selected co-monomers. For example, some suitable co-monomers for polymerization with ethylene or propylene include short-chain alpha-olefins such as 1-butene, 1-hexene and 1-octene, vinyl acetate, and a various acrylates. The basic components of the system include external high shear mixing device (HSD) 40, vessel 10, and pump 5. As shown in FIG. 1, the high shear device is located external to vessel/reactor 10. Each of these components is further described in more detail below. Line 21 is connected to pump 5 for introducing a liquid stream containing solvent and/or monomer. Line 13 connects pump 5 to HSD 40, and line 18 connects HSD 40 to vessel 10. Line 22 is connected to line 13 for introducing a slurry of finely divided catalyst suspended in a suitable solvent. Line 17 is connected to vessel 10 for removal of vent gas. Additional components or process steps may be incorporated between vessel 10 and HSD 40, or ahead of pump 5 or HSD 40, if desired. In an alternative configuration, line 22 is instead configured for introducing a gaseous monomer stream into HSD 40, to form a gas-solid dispersion, as further described below. In still another alternative configuration, line 22 is configured to provide a particulate catalyst stream and line 13 is configured for carrying a solvent into HSD 40.

High Shear Mixing Device. Referring still to FIG. 1, external high shear mixing device (HSD) 40, also sometimes referred to as a high shear mixer, is configured for receiving an inlet stream via line 13. Alternatively, system 1 may be configured with more than one inlet line (not shown). For instance, HSD 40 may be configured for receiving the monomer and catalyst streams via separate inlet lines. Although only one high shear device is shown in FIG. 1, it should be understood that some embodiments of the system may have two or more high shear mixing devices arranged either in series or parallel flow. HSD 40 is a mechanical device that utilizes one or more generators comprising a rotor/stator combination, each of which having a fixed gap between the stator and rotor. HSD 40 is configured in such a way that it is capable of producing a dispersion containing submicron (i.e., less than one micron in diameter) and micron-sized particles (e.g., catalyst particles) dispersed in a gas or liquid medium flowing through the mixer. For example, in some embodiments HSD 40 is capable of highly dispersing a polymerization catalyst into a main liquid phase comprising monomer and solvent, with which it would normally be immiscible, at conditions such that at least a portion of the monomer reacts to produce a polymerization product stream. Alternatively, HSD 40 is configured to produce a dispersion containing submicron- and micron-sized bubbles (e.g., gaseous monomer) dispersed in a liquid medium comprising solvent. In another alternative embodiment, HSD 40 is configured to produce a dispersion containing micron- and submicron-sized monomer bubbles and catalyst particles dispersed in a liquid solvent phase. For carrying out certain gas-solid heterogeneous phase reactions, the HSD 40 is configured for dispersing the catalyst particles into a main gaseous monomer phase. In still another alternative embodiment, HSD 40 is configured for dispersing catalyst and gaseous monomer in a liquid solvent or in a solvent-monomer liquid phase, for certain heterogeneous liquid-gas-solid phase polymerization reactions. The high shear mixer comprises an enclosure or housing so that the pressure and temperature of the mixture may be controlled.

High shear mixing devices are generally divided into three general classes, based upon their ability to mix fluids. Mixing is the process of reducing the size of particles or inhomogeneous species within the fluid. One metric for the degree or thoroughness of mixing is the energy density per unit volume that the mixing device generates to disrupt the fluid particles. The classes are distinguished based on delivered energy densities. Three classes of industrial mixers having sufficient energy density to consistently produce mixtures or dispersions with particle sizes in the range of submicron to 50 microns include homogenization valve systems, colloid mills and high speed mixers. In the first class of high energy devices, referred to as homogenization valve systems, fluid to be processed is pumped under very high pressure through a narrow-gap valve into a lower pressure environment. The pressure gradients across the valve and the resulting turbulence and cavitation act to break-up any particles in the fluid. These valve systems are most commonly used in milk homogenization and can yield average particle sizes in the 0-1 micron range.

At the opposite end of the energy density spectrum is the third class of devices referred to as low energy devices. These systems usually have paddles or fluid rotors that turn at high speed in a reservoir of fluid to be processed, which in many of the more common applications is a food product. These low energy systems are customarily used when average particle sizes of greater than 20 microns are acceptable in the processed fluid.

Between the low energy devices and homogenization valve systems, in terms of the mixing energy density delivered to the fluid, are colloid mills, which are classified as intermediate energy devices. A typical colloid mill configuration includes a conical or disk rotor that is separated from a complementary, liquid-cooled stator by a closely-controlled rotor-stator gap, which is commonly between 0.0254-10.16 mm (0.001-0.40 inch). Rotors are usually driven by an electric motor through a direct drive or belt mechanism. As the rotor rotates at high rates, it pumps fluid between the outer surface of the rotor and the inner surface of the stator, and shear forces generated in the gap process the fluid. Many colloid mills with proper adjustment achieve average particle sizes of 0.1-25 microns in the processed fluid. These capabilities render colloid mills appropriate for a variety of applications including colloid and oil/water-based emulsion processing such as that required for cosmetics, mayonnaise, or silicone/silver amalgam formation, to roofing-tar mixing.

An approximation of energy input into the fluid (kW/L/min) can be estimated by measuring the motor energy (kW) and fluid output (L/min). Tip speed is the circumferential distance traveled by the tip of the rotor per unit of time. Tip speed is thus a function of the rotor diameter and the rotational frequency. Tip speed (in meters per minute, for example) may be calculated by multiplying the circumferential distance transcribed by the rotor tip, $2\pi R$, where R is the radius of the rotor (in meters, for example) times the frequency of revolution (in revolutions per minute). A colloid mill, for example, may have a tip speed in excess of 22.9 m/sec (4500 ft/min) and may exceed 40 m/sec (7900 ft/min). For the purposes of this disclosure, the term "high shear" refers to mechanical rotor stator devices (e.g., colloid mills or rotor/stator mixers) that are capable of tip speeds in excess of 5.1 m/sec. (1000 ft/min) and require an external mechanically driven power device to drive energy into the stream of materials to be reacted. For example, in HSD 40, a tip speed in excess of 22.9 m/sec (4500 ft/min) is achievable, and may exceed 40 m/sec (7900 ft/min). In some embodiments, HSD 40 is capable of delivering at least 300 L/h with a power consumption of about 1.5 kW at a nominal tip speed of at least 22.9 m/sec (4500 ft/min).

HSD 40 combines high tip speeds with a very small shear gap to produce significant shear on the material being processed. The amount of shear will be dependant on the viscosity of the fluid. Accordingly, a local region of elevated pressure and temperature is created at the tip of the rotor during operation of the high shear device. In some cases the locally elevated pressure is about 1034.2 MPa (150,000 psi). In some cases the locally elevated temperature is about 500° C. In some cases these local pressure and temperature elevations may persist for nano or pico seconds. In some embodiments, the energy expenditure of the high shear mixer is greater than 1000 W/m$^3$. In embodiments, the energy expenditure of HSD 40 is in the range of from about 3000 W/m$^3$ to about 7500 W/m$^3$. The shear rate is the tip speed divided by the shear gap width (minimal clearance between the rotor and stator). The shear rate generated in HSD 40 may be greater than 20,000 s$^{-1}$. In some embodiments the shear rate is at least 1,600,000 s$^{-1}$. In embodiments, the shear rate generated by HSD 40 is in the range of from 20,000 s$^{-1}$ to 100,000 s$^{-1}$. For example, in one application the rotor tip speed is about 40 m/sec (7900 ft/min) and the shear gap width is 0.0254 mm (0.001 inch), producing a shear rate of 1,600,000 s$^{-1}$. In another application the rotor tip speed is about 22.9 m/sec (4500 ft/min) and the shear gap width is 0.0254 mm (0.001 inch), producing a shear rate of about 902,000 s$^{-1}$.

In some embodiments, HSD 40 comprises a colloid mill. Suitable colloidal mills are manufactured by IKA® Works, Inc. Wilmington, N.C. and APV North America, Inc. Wilmington, Mass., for example. In some instances, HSD 40 comprises the Dispax Reactor® of IKA® Works, Inc. Several models are available having various inlet/outlet connections, horsepower, nominal tip speeds, output rpm, and nominal flow rate. Selection of a particular device will depend on specific throughput requirements for the intended application, and on the desired particle size in the outlet dispersion from the high shear mixer. In some embodiments, selection of the appropriate mixing tools (generators) within HSD 40 may allow for catalyst size reduction/increase in catalyst surface area.

The high shear device comprises at least one revolving element that creates the mechanical force applied to the reactants. The high shear device comprises at least one stator and at least one rotor separated by a clearance. For example, the rotors may be conical or disk shaped and may be separated from a complementary-shaped stator; both the rotor and stator may comprise a plurality of circumferentially-spaced teeth. In some embodiments, the stator(s) are adjustable to obtain the desired gap between the rotor and the stator of each generator (rotor/stator set). Grooves in the rotor and/or stator may change directions in alternate stages for increased turbulence. Each generator may be driven by any suitable drive system configured for providing the necessary rotation.

In some embodiments, the minimum clearance between the stator and the rotor is in the range of from about 0.0254 mm to about 3.175 mm (about 0.001 inch to about 0.125 inch). In certain embodiments, the minimum clearance between the stator and rotor is about 1.524 mm (0.060 inch). In certain configurations, the minimum clearance between the rotor and stator is at least 1.778 mm (0.07 inch). The shear rate produced by the high shear mixer may vary with longitudinal position along the flow pathway. In some embodiments, the rotor is set to rotate at a speed commensurate with the diameter of the rotor and the desired tip speed. In some embodiments, the colloidal mill has a fixed clearance between the stator and rotor. Alternatively, the colloid mill has adjustable clearance.

In some embodiments, HSD 40 comprises a single stage dispersing chamber (i.e., a single rotor/stator combination, a single generator). In some embodiments, high shear device 40 is a multiple stage inline colloid mill and comprises a plurality of generators. In certain embodiments, HSD 40 comprises at least two generators. In other embodiments, high shear device 40 comprises at least 3 high shear generators. In some embodiments, high shear device 40 is a multistage mixer whereby the shear rate (which varies proportionately with tip speed and inversely with rotor/stator gap) varies with longitudinal position along the flow pathway, as further described herein below.

In some embodiments, each stage of the external high shear device has interchangeable mixing tools, offering flexibility. For example, the DR 2000/4 Dispax Reactor® of IKA® Works, Inc. Wilmington, N.C. and APV North America, Inc. Wilmington, Mass., comprises a three stage dispersing module. This module may comprise up to three rotor/stator combinations (generators), with choice of fine, medium, coarse, and super-fine for each stage. This allows for creation of dispersions having a narrow distribution of the desired particle size. In some embodiments, each of the stages is operated with super-fine generator. In some embodiments, at least one of the generator sets has a rotor/stator minimum clearance of greater than about 5.08 mm (0.20 inch). In some embodiments, at least one of the generator sets has a minimum rotor/stator clearance of greater than about 1.778 mm (0.07 inch). In some embodiments the rotors are 60 mm and the are stators 64 mm in diameter, providing a clearance of about 4 mm.

Figure 2:
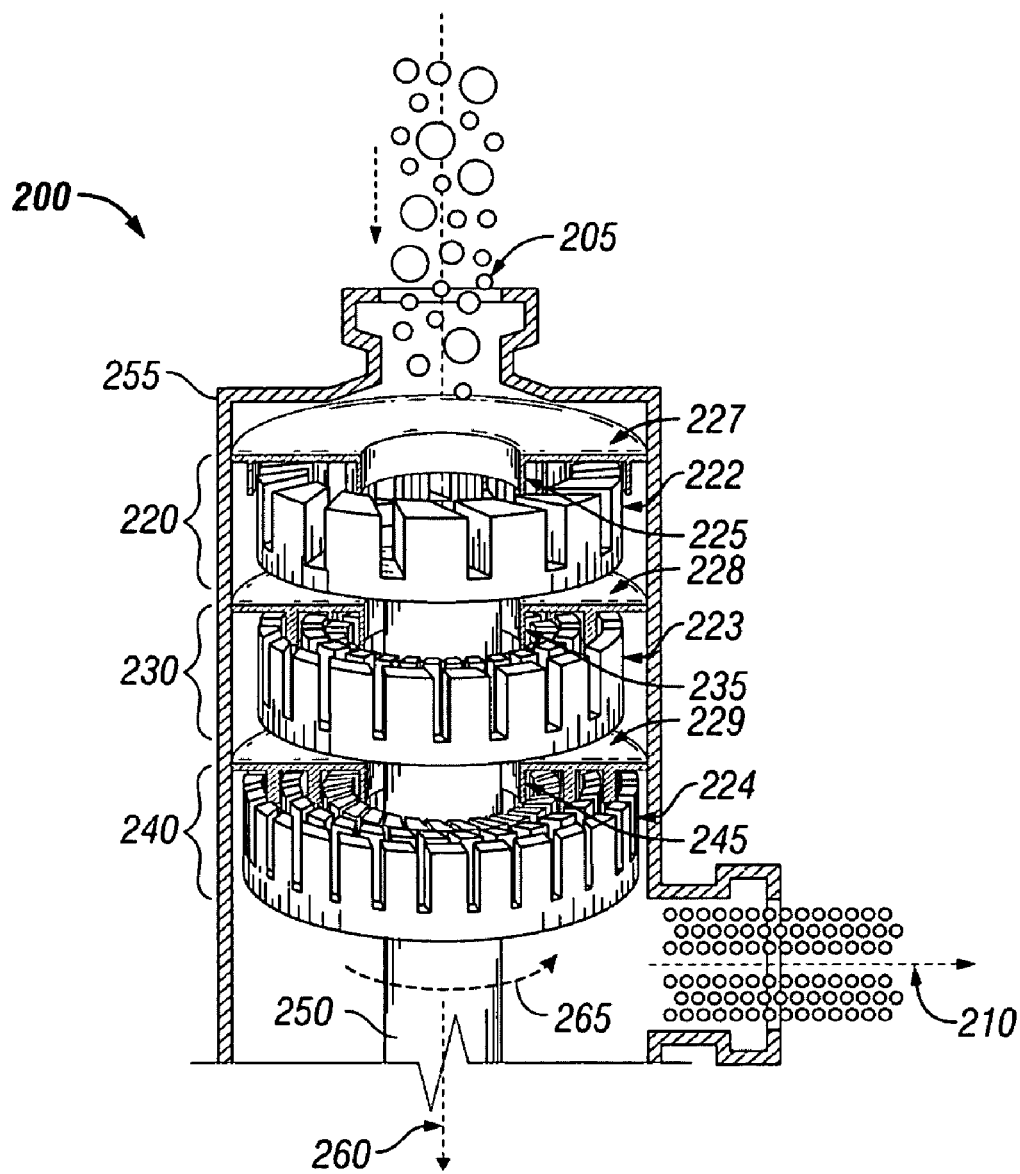
FIG. 2 is a longitudinal cross-section view of a multi-stage high shear device, as employed in an embodiment of the system of FIG. 1.

Referring now to FIG. 2, there is presented a longitudinal cross-section of a suitable high shear device 200. High shear device 200 is a dispersing device comprising three stages or rotor-stator combinations, 220, 230, and 240. Three rotor/stator sets or generators 220, 230, and 240 are aligned in series along drive input 250. The first generator 220 comprises rotor 222 and stator 227. The second generator 230 comprises rotor 223, and stator 228; the third generator 240 comprises rotor 224 and stator 229. For each generator the rotor is rotatably driven by input 250 and rotates, as indicated by arrow 265, about axis 260. Stator 227 is fixedly coupled to high shear device wall 255. Each generator has a shear gap which is the distance between the rotor and the stator. First generator 220, comprises a first shear gap 225; second generator 230 comprises a second shear gap 235; and third generator 240 comprises a third shear gap 245. In some embodiments, shear gaps 225, 235, 245 are between about 0.025 mm and 10.0 mm wide. In some embodiments, the process comprises utilization of a high shear device 200 wherein the gaps 225, 235, 245 are between about 0.5 mm and about 2.5 mm. In certain instances the gap is maintained at about 1.5 mm. Alternatively, the gaps 225, 235, 245 are different for generators 220, 230, 240. In certain instances, the gap 225 for the first generator 220 is greater than about the gap 235 for the second generator 230, which is in turn greater than about the gap 245 for the third generator. As mentioned above, the generators of each stage may be interchangeable, offering flexibility.

Generators 220, 230, and 240 may comprise a coarse, medium, fine, and super-fine characterization. Rotors 222, 223, and 224 and stators 227, 228, and 229 may be toothed designs. Each generator may comprise two or more sets of rotor-stator teeth. Rotors 222, 223, and 224 may comprise a number of rotor teeth circumferentially spaced about the circumference of each rotor. Stators 227, 228, and 229 may comprise a complementary number of stator teeth circumferentially spaced about the circumference of each stator. In some embodiments, the inner diameter of the rotor is about 11.8 cm. In embodiments, the outer diameter of the stator is about 15.4 cm. In certain embodiments, each of three stages is operated with a super-fine generator, comprising a shear gap of between about 0.025 mm and about 3 mm. For applications in which solid particles are to be sent through high shear device 200, shear gap width may be selected for reduction in particle size and increase in particle surface area. In some embodiments, the disperser is configured so that the shear rate will increase stepwise longitudinally along the direction of the flow. The IKA® model DR 2000/4, for example, comprises a belt drive, 4M generator, PTFE sealing ring, inlet flange 25.4 mm (1 inch) sanitary clamp, outlet flange 19 mm (¾ inch) sanitary clamp, 2 HP power, output speed of 7900 rpm, flow capacity (water) approximately 300-700 L/h (depending on generator), a tip speed of from 9.4-41 m/sec (1850 ft/min to 8070 ft/min).

Reactor/Vessel. Vessel or reactor 10 is any type of vessel in which a multiphase reaction can be propagated to carry out the above-described conversion reaction(s). For instance, vessel 10 may be a tower reactor, a tubular reactor or multi-tubular reactor, or it may be a fixed bed reactor. In other embodiments, vessel 10 may be a continuous or semi-continuous stirred tank reactor, or it may comprise one or more batch reactors arranged in series or in parallel. One or more line 15 may be connected to vessel 10 for introducing the initial solvent and monomer, or for injecting catalyst or other material.

Vessel 10 may include one or more of the following items: stirring system, heating and/or cooling capabilities, pressure measurement instrumentation, temperature measurement instrumentation, one or more injection points, and level regulator (not shown), as are known in the art of reaction vessel design. For example, a stirring system may include a motor driven mixer. A heating and/or cooling apparatus may comprise, for example, a heat exchanger. Alternatively, as much of the polymerization reaction may occur within HSD 40, in some embodiments, vessel 10 may serve primarily as a storage vessel in some cases. Although generally less desired, in some applications vessel 10 may be omitted, particularly if multiple high shear mixers/reactors are employed in series, as further described below. Line 16 is connected to vessel 10 for withdrawal or removal of the polyethylene, polypropylene or copolymer product.

Heat Transfer Devices. In addition to the above-mentioned heating/cooling capabilities of vessel 10, other external or internal heat transfer devices for heating or cooling a process stream are also contemplated in variations of the embodiments illustrated in FIG. 1. Some suitable locations for one or more such heat transfer devices are between pump 5 and HSD 40, between HSD 40 and vessel 10, and between vessel 10 and pump 5 when system 1 is operated in multi-pass mode. Some non-limiting examples of such heat transfer devices are shell, tube, plate, and coil heat exchangers, as are known in the art.

Pumps. Pump 5 is configured for either continuous or semi-continuous operation, and may be any suitable pumping device that is capable of providing greater than 203 kPa (2 atm) pressure, preferably greater than 3 atm pressure, to allow controlled flow through HSD 40 and system 1. For example, a Roper Type 1 gear pump, Roper Pump Company (Commerce Ga.) Dayton Pressure Booster Pump Model 2P372E, Dayton Electric Co (Niles, Ill.) is one suitable pump. Preferably, all contact parts of the pump comprise stainless steel. If corrosive substances are to be pumped it may be desirable to provide gold plated contact surfaces. In some embodiments of the system, pump 5 is capable of pressures greater than about 2027 kPa (20 atm). In addition to pump 5, one or more additional, high pressure pump (not shown) may be included in the system illustrated in FIG. 1. For example, a booster pump, which may be similar to pump 5, may be included between HSD 40 and vessel 10 for boosting the pressure into vessel 10. As another example, a supplemental feed pump, which may be similar to pump 5, may be included in line 15 for introducing monomer, solvent, initiator or catalyst into vessel 10. Line 24 connects vessel 10 to line 21 for introducing the initial liquid stream into HSD 40 via pump 5 and line 13, or for multi-pass operation, as further described herein below. As still another example, a compressor type pump may be positioned between line 17 and HSD 40 for recycling gas from vessel 10 to an inlet of the high shear device.

Process for Production of Polyethylene or Polypropylene.

In operation for the production of polymer by heterogeneous liquid-solid or liquid-solid-gas phase catalyzed reaction of ethylene and/or propylene, the monomer(s), any desired co-monomers, and solvent are first combined in vessel 10. The monomers and/or solvent may be initially introduced into vessel 10 via one or more feed line 15. In some embodiments, the monomer solution contains about 70% ethylene or propylene dissolved in a suitable organic solvent, such as, for example, hexane, cyclohexane, butane or pentane.

The process may be operated in either continuous or semi-continuous flow mode, or it may be operated in batch mode. The contents of vessel 10 are maintained at a specified bulk reaction temperature using suitable heating and/or cooling capabilities (e.g., cooling coils) and temperature measurement instrumentation. Pressure in the vessel may be monitored using suitable pressure measurement instrumentation, and the level of reactants in the vessel may be controlled using a level regulator (not shown), employing techniques that are known to those of skill in the art. The contents are stirred or circulated continuously or semi-continuously.

Pump 5 is operated to pump the liquid stream (e.g., solvent or monomer-solvent solution) from reactor/vessel 10, via lines 24 and 21, and to build pressure and feed HSD 40, providing a controlled flow through line 13 and high shear mixer (HSD) 40, and throughout high shear system 1. In some embodiments, pump 5 increases the pressure of the liquid stream to greater than 203 kPa (2 atm), preferably greater than about 304 kPa (3 atm). In some applications, pressures greater than about 2027 kPa (20 atm) may be used to accelerate reactions, with the limiting factor being the pressure limitations of the selected pump 5 and high shear mixer 40. In some cases gaseous monomer may be introduced via a line similar to line 22 into a liquid stream flowing through line 13. In some embodiments, the monomer-containing stream in line 13 comprises ethylene and/or polyethylene monomer, plus any desired co-monomers, dissolved in a suitable solvent, for the catalyzed polymerization of the monomers to form polyethylene or polypropylene, or a co-monomer thereof. In some embodiments, the monomer-containing stream comprises solvent and gaseous monomer bubbles, with or without catalyst particles or initiator.

Catalyst. A slurry of finely divided catalyst suspended in a suitable solvent is combined with the monomer stream, or with a solvent-monomer stream, in line 13, by introduction through line 22. In some embodiments, the catalyst slurry contains about 0.00001 to 0.1 percent Ziegler-Natta catalyst such as $TiCl_4$/alkyl aluminum chloride. In some embodiments, the catalyst is a metallocene catalyst. Metallocene compounds consist of two cyclopentadienyl anions (Cp) bound to a metal center in the oxidation state II, generally corresponding to the general formula $(C_5R_5)_2M$. Ziegler-Natta catalysts and metallocene catalysts are well known in the field of olefin polymerization. Alternatively, any other suitable olefin polymerization catalyst may be employed in the present methods. In some embodiments, in which a solid catalyst is sent through HSD 40, the selected mixing tools (i.e., rotor/stator sets or generators) allow for catalyst size reduction and/or increase in catalyst surface area.

The monomer-containing liquid stream is continuously pumped into line 13 to form the high shear mixer feed stream. Additional solvent may be introduced into line 13, and in some embodiments, monomer and/or solvent is introduced independently into HSD 40. The actual ratio of the raw materials used is determined based on the desired selectivity and operating temperatures and pressures. In some embodiments, the pressure is kept high enough throughout system 1 to keep the monomer in solution. For the purposes of this disclosure, the terms "superficial pressure" and "superficial temperature" refer to the apparent, bulk, or measured pressure or temperature, respectively, in a vessel, conduit or other apparatus of the system. The actual temperatures and/or pressures at which the reactants make contact and react in the microenvironment of a transient cavity produced by the hydrodynamic forces of the high shear mixer may be quite different, as further discussed elsewhere herein.

After pumping, the catalyst and monomer liquid phase are mixed within HSD 40, which serves to create a fine dispersion of the catalyst in the monomer-containing liquid phase, which may also include initiator. In some embodiments it creates a fine mixture, emulsion or dispersion of the reactants, which may also include catalyst. As used herein, the term "dispersion" refers to a liquefied mixture that contains two distinguishable substances (or phases) that will not readily mix and dissolve together. A dispersion comprises a continuous phase (or matrix), which holds therein discontinuous droplets, bubbles, and/or particles of the other phase or substance. The term dispersion may thus refer to foams comprising gas bubbles suspended in a liquid continuous phase, emulsions in which droplets of a first liquid are dispersed throughout a continuous phase comprising a second liquid with which the first liquid is immiscible, and continuous liquid phases throughout which solid particles are distributed. The term "dispersion" encompasses continuous liquid phases throughout which gas bubbles are distributed, continuous liquid phases throughout which solid particles (e.g., solid catalyst) are distributed, continuous phases of a first liquid throughout which droplets of a second liquid that is substantially insoluble in the continuous phase are distributed, and liquid phases throughout which any one or a combination of solid particles, immiscible liquid droplets, and gas bubbles are distributed. Hence, a dispersion can exist as a homogeneous mixture in some cases (e.g., liquid/liquid phase), or as a heterogeneous mixture (e.g., gas/liquid, solid/liquid, or gas/solid/liquid), depending on the nature of the materials selected for combination.

In HSD 40, the catalyst and monomer are highly dispersed such that nanoparticles and microparticles of the catalyst are formed for superior dissolution into solution and/or enhancement of reactant mixing. For example, disperser IKA® model DR 2000/4, a high shear, three stage dispersing device configured with three rotors in combination with stators, aligned in series, is used to create the dispersion of dispersible catalyst in liquid medium comprising the monomers and any initiators (i.e., "the reactants"). The rotor/stator sets may be configured as illustrated in FIG. 2, for example. For some applications, the direction of rotation of the generators may be opposite that shown by arrow 265 (e.g., clockwise or counterclockwise about axis of rotation 260). The combined reactants entering the high shear mixer via line 13 proceed to a first stage rotor/stator combination having circumferentially spaced first stage shear openings. In some applications, the direction of flow of the reactant stream entering inlet 205 corresponds to the axis of rotation 260. The coarse dispersion exiting the first stage enters the second rotor/stator stage, having second stage shear openings. The reduced particle-size dispersion emerging from the second stage enters the third stage rotor/stator combination having third stage shear openings. The dispersion exits the high shear mixer via line 18. In some embodiments, the shear rate increases stepwise longitudinally along the direction of the flow. For example, in some embodiments, the shear rate in the first rotor/stator stage is greater than the shear rate in subsequent stage(s). In other embodiments, the shear rate is substantially constant along the direction of the flow, with the stage or stages being the same. If the high shear mixer includes a PTFE seal, for example, the seal may be cooled using any suitable technique that is known in the art. For example, the reactant stream flowing in line 13 may be used to cool the seal and in so doing be preheated as desired prior to entering the high shear mixer.

The rotor of HSD 40 is set to rotate at a speed commensurate with the diameter of the rotor and the desired tip speed. As described above, the high shear mixer (e.g., colloid mill) has either a fixed clearance between the stator and rotor or has adjustable clearance. HSD 40 serves to intimately mix the catalyst and the liquid phase (i.e., monomer or solvent, or both). In some embodiments of the process, the transport resistance of the reactants is reduced by operation of the high shear mixer such that the velocity of the reaction is increased by greater than a factor of 5. In some embodiments, the velocity of the reaction is increased by at least a factor of 10. In some embodiments, the velocity is increased by a factor in the range of about 10 to about 100 fold. In some embodiments, HSD 40 delivers at least 300 L/h with a power consumption of 1.5 kW at a nominal tip speed of at least 22.9 m/sec (4500 ft/min), and which may exceed 40 m/sec (7900 ft/min). Although measurement of instantaneous temperature and pressure at the tip of a rotating shear unit or revolving element in HSD 40 is difficult, it is estimated that the localized temperature seen by the intimately mixed reactants is in excess of 500° C. and at pressures in excess of 5000 kPa (500 kg/cm$^2$) under cavitation conditions. The high shear mixing results in dispersion of the catalyst in micron or submicron-sized particles (i.e., mean diameter less than one micron). In some embodiments, the resultant dispersion has an average particle size less than about 1.5 µm. In some embodiments, the mean bubble size is less than one micron in diameter. Accordingly, the dispersion exiting HSD 40 via line 18 comprises micron and/or submicron-sized particles. In some embodiments, the mean particle size is in the range of about 0.4 µm to about 1.5 µm. In some embodiments, the mean particle size is less than about 400 nm, in the range of about 200 nm to about 400 nm, or is about 100 nm in some cases. For the purposes of this disclosure, a nanodispersion is a dispersion of heterogeneous solid-liquid phases in which the sizes of the particles in the dispersed phase are less than 1000 nanometers (i.e., <1 micron in diameter). A nanodispersion is sometimes also referred to herein as a "dispersion." In many embodiments, the nanodispersion is able to remain dispersed at atmospheric pressure for at least 15 minutes.

Once dispersed, the resulting nanodispersion exits HSD 40 via line 18 and feeds into vessel 10, as illustrated in FIG. 1, wherein polymerization occurs or continues to take place. If desired, the dispersion may be further processed prior to entering vessel 10. For example, further mixing in one or more successive high shear mixing devices, similar to HSD 40 with the same or different generator configurations, may be performed, before the process stream enters reactor/vessel 10. Although, in some embodiments, the polymerization reaction may take place to at least some extent without a catalyst or initiator, in most embodiments a catalyst or initiator is included. Some suitable types of catalyst are Ziegler-Natta catalysts and metallocene catalysts, as discussed above. Alternatively, another suitable olefin polymerization catalyst may be used. In some embodiments a chain transfer agent (i.e., hydrogen) is added to terminate the polymerization process and control the molecular weight of the polymer. Hydrogen may be added at any point in the polymerization process where chain termination is desired. One or more such additives may be injected at line 13, line 18, or any other suitable point in the process, or as illustrated in the flow diagram shown in FIG. 1. In some embodiments, a heterogeneous reaction takes place in which the intimately mixed monomer and finely divided catalyst are in the form of a highly dispersed liquid. In some embodiments, as a result of the intimate mixing of the reactants prior to entering reactor 10, a significant portion of the chemical reaction may take place in HSD 40, with or without the presence of catalyst. Polymerization of monomer to the corresponding polymer will occur whenever suitable time, temperature and pressure conditions exist, facilitated in some cases by the presence of the catalyst and/or initiator. In this sense the polymerization of monomer may occur at any point in the flow diagram of FIG. 1 if temperature and pressure conditions are suitable. A discrete reactor is usually desirable, however, to allow for increased residence time, agitation and heating and/or cooling of the bulk reactants. Accordingly, in some embodiments, reactor/vessel 10 may be used primarily for heating and separation of volatile reaction products (i.e., vent gas) from the polymerization product.

Alternatively, vessel 10 may serve as a primary reaction vessel where most of the polymer is produced in some embodiments. For example, the process may be operated as a single pass or "once through" process in order to minimize subjecting the formed polymer to shearing, in which case vessel 10 may serve as the primary reaction vessel. Vessel/reactor 10 may be operated in either continuous or semi-continuous flow mode, or it may be operated in batch mode. The contents of vessel 10 may be maintained at a specified reaction temperature using heating and/or cooling capabilities (e.g., cooling coils) and temperature measurement instrumentation. Pressure in the vessel may be monitored using suitable pressure measurement instrumentation, and the level of reactants in the vessel may be controlled using a level regulator (not shown), employing techniques that are known to those of skill in the art. The contents are stirred continuously or semi-continuously.

The bulk or global operating temperature of the reactants is desirably maintained below their flash points. In some embodiments, the operating conditions of system 1 comprise a temperature in the range of from about 20° C. to about 230° C. In some embodiments, the temperature is less than about 200° C. In some embodiments, the temperature is in the range of from about 160° C. to 180° C. In specific embodiments, the reaction temperature in vessel 10, in particular, is in the range of from about 155° C. to about 160° C. In some embodiments the process is operated at ambient temperature. In some embodiments, the reaction pressure in vessel 10 is in the range of from about 203 kPa (2 atm) to about 5573 kPa-6080 kPa (55-60 atm). In some embodiments, reaction pressure is in the range of from about 811 kPa to about 1520 kPa (about 8 to about 15 atm). In some embodiments, the reaction pressure is less than 600 kPa (6 atm). The superior dissolution and/or dispersion provided by the external high shear mixing potentially allows a decrease in operating pressure while maintaining or even increasing reaction rate. Operating the polymerization process at decreased pressure potentially decreases wear of the materials constituting the reactors, the piping, and the mechanical parts of the plant, as well as the ancillary devices, in some embodiments of the high shear enhanced polymerization process.

The polymerization product may be produced either continuously, semi-continuously or batch wise, as desired, and is removed from system 1 via product line 16. In some embodiments, a plurality of reactor product lines 16 are used to remove the product. Vent gas, containing unconverted monomer vapor and any volatile side reaction products, for example, exit reactor 10 via line 17. In some instances, it may be desirable to use a compressor type pump to recycle vent gases in line 17 back into HSD 40. The vent gas may be further treated and vented, or its components may be recycled, as desired, using known techniques. Reaction product comprising polymer and dissolved, unconverted monomer exits reactor 10 by line 16. In some embodiments the product stream is further processed. For example, the content of unconverted monomer in the product stream may be reduced using suitable techniques as are known. The polymer product may be used to manufacture any of a wide variety of commercial products. For instance, it may serve as the raw material for making packaging materials, vinyl flooring, plumbing pipe, clothing, upholstery or building materials.

Multiple Pass Operation. Referring still to FIG. 1, the system is configured for either single pass or multi-pass operation, wherein, after the initial preparation of the monomer-solvent solution in vessel 10 and commencement of the process, the output from line 16 of vessel 10 goes directly to recovery of the polymer product or to further processing. In some embodiments it may be desirable to pass the contents of vessel 10, or a portion thereof containing unreacted monomer, through HSD 40 during a second pass. In this case, the dispersion and the initially formed polymer may be returned via lines 24 and 21, pump 5, and line 13, to HSD 40, for further dispersion and reaction. Additional catalyst slurry may be injected via line 22 into line 13, or it may be added directly into the high shear mixer (not shown), if needed. Additional solvent or monomer may be injected at line 13, as needed.

In some embodiments, two or more high shear devices like HSD 40, or they may be configured differently, are aligned in series, and are used to further enhance the reaction. Their operation may be in either batch or continuous mode. In some instances in which a single pass or "once through" process is desired, the use of multiple high shear devices in series may also be advantageous. For instance, in some applications, where low density product containing shorter polymer chains is desired, the product may be recycled via lines 24 and 21, to pump 5, and through high shear mixer 40, before returning via line 18 to vessel 10. In some embodiments where multiple high shear devices are operated in series, vessel 10 may be omitted. When multiple high shear devices 40 are operated in series, additional reactant(s) may be injected into the inlet feed stream of each device. In some embodiments, multiple high shear devices 40 are operated in parallel, and the outlet dispersions therefrom are introduced into one or more vessel 10.

In some alternative embodiments, the catalyst is not circulated through HSD 40, but is instead retained in vessel 10, where it is contacted by the premixed monomer(s) exiting HSD 40 via line 18. For instance, in cases where very low molecular weight and/or very low concentrations of high molecular weight polymer in solvent are to be produced, a fixed bed reactor may be used as vessel 10, provided that it is not allowed to become blocked by polymer. In this case, solvent is pumped through line 21 and gaseous monomer is injected via line 22 into the flowing stream in line 13, which then flows into HSD 40 and is subjected to the high shear mixing as described above, to form a gas-liquid dispersion. For example, the injection could be propylene or ethylene gas injected into a solvent medium like hexane and then polymerized with the use of a catalyst. The gas-liquid dispersion then contacts the catalyst in vessel 10, where polymerization occurs. Without wishing to be limited by theory, it is believed that submicron-sized bubbles dispersed in a liquid undergo movement primarily through Brownian motion effects. The bubbles in the product dispersion created by HSD 40 may have greater mobility through boundary layers of catalyst particles in vessel 10, thereby facilitating and accelerating the catalytic reaction through enhanced transport of reactants.

In some variations of an above-described procedure, catalyst is circulated through HSD 40 and gaseous monomer is introduced (via line 22) into a flowing stream of solvent in line 13, which may contain dissolved monomer. As a result of the high shear mixing, a heterogeneous solid-gas-liquid reaction mixture exits HSD 40 via line 18. The polymerization reaction may occur in HSD 40, line 18, and/or vessel 10, or at any other point in system 1 where temperature and pressure conditions are favorable.

In another variation of an above-described procedure, a gas-solid heterogeneous phase polymerization reaction is carried out in HSD 40. In this case, solvent or liquid monomer is not fed into HSD 40, and instead a gaseous monomer stream flows through line 13 and catalyst particles are introduced via line 22. A dispersion of catalyst particles dispersed in gaseous monomer is produced in the high shear mixing device. This variation may be desired, for example, when is desirable for the gaseous monomers to oligomerize in a gas-solid reaction with the catalyst.

In still another variation of an above-described procedure, a liquid-liquid homogeneous phase mixture of dissolved monomer in a suitable solvent (e.g., hexane) is introduced into HSD 40, with or without catalyst, and is subjected to high shear mixing as described above. The polymerization reaction may occur in HSD 40, line 18, and/or vessel 10, or at any other point in system 1 where catalyst is present and the temperature and pressure conditions are favorable.

The application of enhanced mixing of the reactants by HSD 40 potentially causes greater polymerization of the monomer in some embodiments of the process. In some embodiments, the enhanced mixing potentiates an increase in throughput of the process stream. In some embodiments, the high shear mixing device is incorporated into an established process, thereby enabling an increase in production (i.e., greater throughput). In contrast to some existing methods that attempt to increase the degree of polymerization by increasing reactor pressures, the superior dissolution and/or dispersion provided by external high shear mixing may allow in many cases a decrease in overall operating pressure while maintaining or even increasing the polymerization rate. Without wishing to be limited to a particular theory, it is believed that the level or degree of high shear mixing is sufficient to increase rates of mass transfer and may also produce localized non-ideal conditions that enable reactions to occur that might not otherwise be expected to occur based on Gibbs free energy predictions. Localized non ideal conditions are believed to occur within the high shear device resulting in increased temperatures and pressures with the most significant increase believed to be in localized pressures. The increase in pressures and temperatures within the high shear device are instantaneous and localized and quickly revert back to bulk or average system conditions once exiting the high shear device. In some cases, the high shear mixing device induces cavitation of sufficient intensity to dissociate one or more of the reactants into free radicals, which may intensify a chemical reaction or allow a reaction to take place at less stringent conditions than might otherwise be required. Cavitation may also increase rates of transport processes by producing local turbulence and liquid micro-circulation (acoustic streaming). An overview of the application of cavitation phenomenon in chemical/physical processing applications is provided by Gogate et al., "Cavitation: A technology on the horizon," *Current Science* 91 (No. 1): 35-46 (2006). The high shear mixing device of certain embodiments of the present system and methods is operated under what is believed to be cavitation conditions effective to dissociate the reactants into free radicals which then form the polymer.

In some embodiments, use of an above-described high shear process allows for greater catalyzed polymerization of monomer to polymerization product and/or an increase in throughput of the reactants. In some embodiments, an external high shear mixing device is incorporated into an established process, thereby making possible an increase in production compared to the process operated without the high shear mixing of the reactants. In some embodiments, a disclosed process or system makes possible the design of a smaller and/or less capital intensive process than previously possible without the incorporation of the external high shear mixing device. In some embodiments, the application of a disclosed method potentially reduces operating costs/increases production from an existing process. In certain embodiments, the use of a disclosed method may reduce capital costs for the design of new polymerization processes. Still other potential benefits of some embodiments of the system and method for the production of polyethylene or polypropylene include, but are not limited to, faster cycle times, increased throughput, higher monomer conversion, reduced operating costs and/or reduced capital expense due to the possibility of designing smaller reactors and/or operating the polymerization process at lower temperature and/or pressure. In some embodiments, a polymerization method is provided for the production of polypropylene, polyethylene, or copolymers thereof, without the need for large volume reactors and without the need to recover substantial amounts of unconverted monomer.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope protection is not limited by the description set out above but is only limited by the claims which follow, that scope including all equivalents of the subject matter of the claims. Each and every original claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent they provide exemplary, procedural or other details supplementary to those set forth herein.

What is claimed is:

1. A method for producing polyethylene, comprising:
   obtaining a high shear mixing device;
   forming in said high shear mixing device a high shear mixture comprising ethylene and a polymerization catalyst dispersed in a solvent, wherein said high shear mixture comprises submicron-sized ethylene gas-containing bubbles dispersed in a liquid phase, wherein forming said high shear mixture comprises an energy expenditure of at least 1000 W/m$^3$; and
   subjecting the high shear mixture to polymerization conditions comprising pressure in the range of about 203 kPa to about 6080 kPa and temperature in the range of about 20° C. to about 230° C., whereby at least a portion of said ethylene is polymerized to form polyethylene.

2. The method of claim 1 wherein said high shear mixture comprises submicron-sized catalyst particles.

3. A method for producing polypropylene, comprising:
   obtaining a high shear mixing device;
   forming in said high shear mixing device a high shear mixture comprising propylene and a polymerization catalyst dispersed in a solvent, wherein said high shear mixture comprises submicron-sized propylene gas-containing bubbles dispersed in a liquid phase, wherein forming said high shear mixture comprises an energy expenditure of at least 1000 W/m$^3$; and
   subjecting the high shear mixture to polymerization conditions comprising pressure in the range of about 203 kPa to about 6080 kPa and temperature in the range of about 20° C. to about 230° C., whereby at least a portion of said propylene is polymerized to form polypropylene.

4. The method of claim 3 wherein said high shear mixture comprises submicron-sized catalyst particles.

5. A method for producing a polymer, comprising:
   obtaining a high shear mixing device;
   forming in said high shear mixing device a high shear mixture comprising submicron-sized monomer gas-containing bubbles and a solvent, wherein said monomer is selected from the group consisting of ethylene, propylene, and mixtures thereof, and wherein forming said high shear mixture comprises an energy expenditure of at, least 1000 W/m$^3$; and subjecting the high shear mixture to polymerization conditions comprising subjecting said high shear mixture to a pressure in the range of about 203 kPa to about 6080 kPa and a temperature in the range of about 20° C. to about 230° C., to form polyethylene or polypropylene, or a copolymer thereof.

6. The method of claim 5, wherein said high shear mixture comprises submicron-sized catalyst particles dispersed in said solvent.

7. The method of claim 5, wherein said polymerization conditions comprise contacting said high shear mixture with a catalyst.

8. The method of claim 2, wherein the particles or bubbles have a mean diameter of less than 400 nm.

9. The method of claim 2, wherein the particles or bubbles have a mean diameter of no more than 100 nm.

10. The method of claim 5, wherein said polymerization conditions comprise pressure less than about 600 kPa and temperature less than 200° C.

11. The method of claim 5, wherein forming said high shear mixture comprises subjecting said monomer and solvent to a shear rate of greater than 20,000s$^{-1}$.

12. The method of claim 6, wherein said high shear mixing device comprises a rotor stator set having a rotor tip, and forming said high shear mixture comprises subjecting said monomer, solvent and catalyst particles to a rotor tip speed of at least 22.9 m/sec.

13. The method of claim 12, wherein said tip speed is at least 40 m/sec.

14. The method of claim 5, wherein said high shear mixing device comprises a rotor/stator set having a rotor tip, and said high shear mixing produces a local pressure of at least 1034 MPa at said tip.

15. The method of claim 5, wherein polymerization occurs at a velocity at least 5 fold greater than that of a similar method wherein the monomer and solvent are not subjected to said high shear mixing.

16. The method of claim 5, further comprising transferring said high shear mixture from said high shear mixing device into a reaction vessel.

17. The method of claim 5 wherein said monomer comprises ethylene and either vinyl acetate or propylene.

* * * * *